(12) United States Patent
Gonzalez Alemany et al.

(10) Patent No.: US 9,776,833 B2
(45) Date of Patent: Oct. 3, 2017

(54) CONVEYOR SYSTEM FOR THE TRANSPORT OF PASSENGERS/GOODS

(71) Applicant: THYSSENKRUPP ELEVATOR INNOVATION CENTER, S.A., Gijon (ES)

(72) Inventors: Miguel Angel Gonzalez Alemany, Oviedo (ES); Juan Domingo Gonzalez Pantiga, Gijon (ES); Enrique Gonzalez Fernandez, Gijon (ES); José Mendiolagoitia Juliana, Gijon (ES); Alberto Pello Garcia, Piedras Blancas (ES); Francisco Palomero Cocho, Gijon (ES); Aurelio Castaño Lantero, Langreo (ES); Eduardo Moran Garcia, Gijon (ES); Pedro Ros Zuazua, Oviedo (ES); Javier Martinez Gutierrez, Oviedo (ES); Ignacio Muslera Fernandez, Gijon (ES)

(73) Assignee: THYSSENKRUPP ELEVATOR INNOVATION CENTER, S.A., Gijon (Asturias) (ES)

( * ) Notice: Subject to any disclaimer, the term of this patent is extended or adjusted under 35 U.S.C. 154(b) by 0 days.

(21) Appl. No.: 14/655,355

(22) PCT Filed: Oct. 7, 2013

(86) PCT No.: PCT/EP2013/070816
§ 371 (c)(1),
(2) Date: Jun. 25, 2015

(87) PCT Pub. No.: WO2014/102019
PCT Pub. Date: Jul. 3, 2014

(65) Prior Publication Data
US 2015/0336772 A1 Nov. 26, 2015

(30) Foreign Application Priority Data

Dec. 26, 2012 (ES) .................................. 201232025

(51) Int. Cl.
*B65G 37/00* (2006.01)
*B66B 21/12* (2006.01)
(Continued)

(52) U.S. Cl.
CPC .............. *B66B 21/12* (2013.01); *B65G 37/00* (2013.01); *B65G 43/10* (2013.01); *B66B 23/02* (2013.01); *B66B 25/00* (2013.01)

(58) Field of Classification Search
CPC ...................................................... B65G 37/00
(Continued)

(56) References Cited

U.S. PATENT DOCUMENTS 2,152,288 A * 3/1939 Seybold ................. B65H 29/16
271/203
3,485,182 A 12/1969 Kenneth et al.
(Continued)

FOREIGN PATENT DOCUMENTS

CH 630302 A 6/1982
CN 1238300 A 12/1999
(Continued)

OTHER PUBLICATIONS

PCT International Search Report mailed Dec. 20, 2013 for PCT International Application No. PCT/EP2013/070816 3 pages.
(Continued)

*Primary Examiner* — Leslie A Nicholson, III
*Assistant Examiner* — Lester Rushin
(74) *Attorney, Agent, or Firm* — RMCK Law Group, PLC

(57) ABSTRACT

A conveyor system for displacing passenger/goods formed by a moving endless belt comprising a plurality of pallet
(Continued)

assemblies and drive means to transmit a drive movement to the pallet belt. The pallets have a functional surface opposite to the support surface and having first meshing means. The drive means comprise second meshing means designed to interact with the first meshing means, so that the drive pallets, are driven by the drive means by means of a meshing between the first meshing means and the second meshing means and to drive said pallet belt in the movement direction D. The drive means have a linear motor aligned with the movement direction D.

10 Claims, 2 Drawing Sheets

(51) Int. Cl.
*B65G 43/10* (2006.01)
*B66B 25/00* (2006.01)
*B66B 23/02* (2006.01)

(58) Field of Classification Search
USPC ............................. 198/334, 324, 321, 322
See application file for complete search history.

(56) References Cited

U.S. PATENT DOCUMENTS

| | | | |
|---|---|---|---|
| 3,834,520 A | 9/1974 | Patin | |
| 3,939,959 A | 2/1976 | Dunstan et al. | |
| 4,197,933 A * | 4/1980 | Dunstan | H02K 41/025 |
| | | | 104/290 |
| 4,276,976 A | 7/1981 | Dunstan et al. | |
| 4,800,818 A * | 1/1989 | Kawaguchi | B23Q 7/1436 |
| | | | 104/290 |
| 4,841,869 A | 6/1989 | Takeuchi et al. | |
| 6,206,170 B1 | 3/2001 | Kissel et al. | |
| 6,675,949 B1 * | 1/2004 | Gonzalez Alemany | B66B 21/12 |
| | | | 198/334 |
| 6,766,684 B2 * | 7/2004 | Bertz | G01M 13/021 |
| | | | 73/116.01 |
| 8,626,329 B2 * | 1/2014 | Dickson | B23P 21/004 |
| | | | 198/343.1 |
| 2008/0164119 A1 | 7/2008 | Alemany et al. | |
| 2010/0185320 A1 | 7/2010 | Nemeth-Csoka | |

FOREIGN PATENT DOCUMENTS

| | | | | |
|---|---|---|---|---|
| CN | 101234726 A | | 8/2008 | |
| CN | 101934966 A | | 1/2011 | |
| CN | 202435187 U | * | 9/2012 | ............... H02K 7/10 |
| ES | 2179720 A1 | | 1/2003 | |
| TW | 628721 B | | 4/2003 | |

OTHER PUBLICATIONS

First Office Action for the corresponding Chinese Application No. 201380068379.3.
First Office Action of the corresponding European Patent Application No. 13774140.1.
Search Results for corresponding Spanish Patent No. 2400373.

* cited by examiner

CONVEYOR SYSTEM FOR THE TRANSPORT OF PASSENGERS/GOODS

CROSS-REFERENCE TO RELATED APPLICATIONS

This application is a 371 U.S. National Stage of International Application No. PCT/EP2013/070816, filed Oct. 7, 2013, which claims priority to Spanish Application No. P201232025 filed on Dec. 26, 2012. The disclosure of each of the above applications is incorporated herein by reference in their entirety.

TECHNICAL FIELD

The present disclosure relates to conveyor systems for the transportation of passengers/goods. More particularly, it relates to a system having low speed sections located in an embarking/disembarking area, a high speed section located in a middle area, and transitional speed sections, located between the embarking/disembarking area and the middle area.

The present disclosure is applied to mechanical walkways such as those used in airports, stations and generally in large public places in which users must walk more or less large sections and in which it is intended to make this type of displacements easier.

BACKGROUND

It is common to find mechanical walkways like those mentioned above in which various sections are defined, acting at different speeds such that, according to the operating direction thereof, a first embarking area having a low speed, an acceleration area, a maximum speed intermediate area, a deceleration area, and a low speed disembarking area are established in the walkway.

To achieve the variable speed, which is necessary in the acceleration and deceleration areas, there are different solutions including the one provided in ES2179720. Said document describes an acceleration walkway with a moving surface formed by plate assemblies, each one formed by a driven plate and a driving plate, articulated to one another according to an axis, perpendicular to the operating direction. The walkway includes embarking and disembarking areas in which the plates circulate at low speed, a central area in which the plates circulate at high speed, and two transition areas in which the plates accelerate and decelerate as a result of the use of different driving systems for each one of the areas.

SUMMARY

The present invention provides a conveyor system in which the drive elements of the pallets have a more simplified operation than in the state of the art closest to the invention. Instead of using different drive means for each area, such as chains in the low and high speed areas and variable pitch spindles in the transitional areas, a single driving element is used to control the speed of the pallet assemblies. This single driving element allows providing sections with different speed profiles, that is, low speed in the embarking and disembarking areas, high speed in the central area and the corresponding transitional areas between the high and the low speed areas.

In the present invention, it is not necessary to use different drive means for each area that displays a different speed profile. By choosing a design for each one of them, which meets all the requirements of the system, is possible to avoid the need of having to use a chain for the embarking-low speed area, a chain for the disembarking-low speed area, a chain for the central-maximum speed area, a variable pitch spindle for the acceleration area, from the embarking-low speed area to the central-maximum speed area and a variable pitch spindle for the deceleration area, from the central-maximum speed area to the disembarking-low speed area.

Given that the number of components in the system is reduced, among others the number of mechanical elements and transmissions, as a result, the maintenance work is also reduced besides simplifying such work whenever is required. On the other hand, noises and noise levels as well as vibrations are also reduced, given that the known systems present an excess of mechanical frictions and transmissions.

The invention relates to a conveyor system for the transportation of passengers/goods such as the one defined in the set of claims.

BRIEF DESCRIPTION OF THE DRAWINGS

Next, for a better understanding of the invention, a series of drawings will be described very briefly. The drawings are expressly related to an embodiment of said invention, which arises as a non-limiting example thereof.

DETAILED DESCRIPTION

Figure 1:
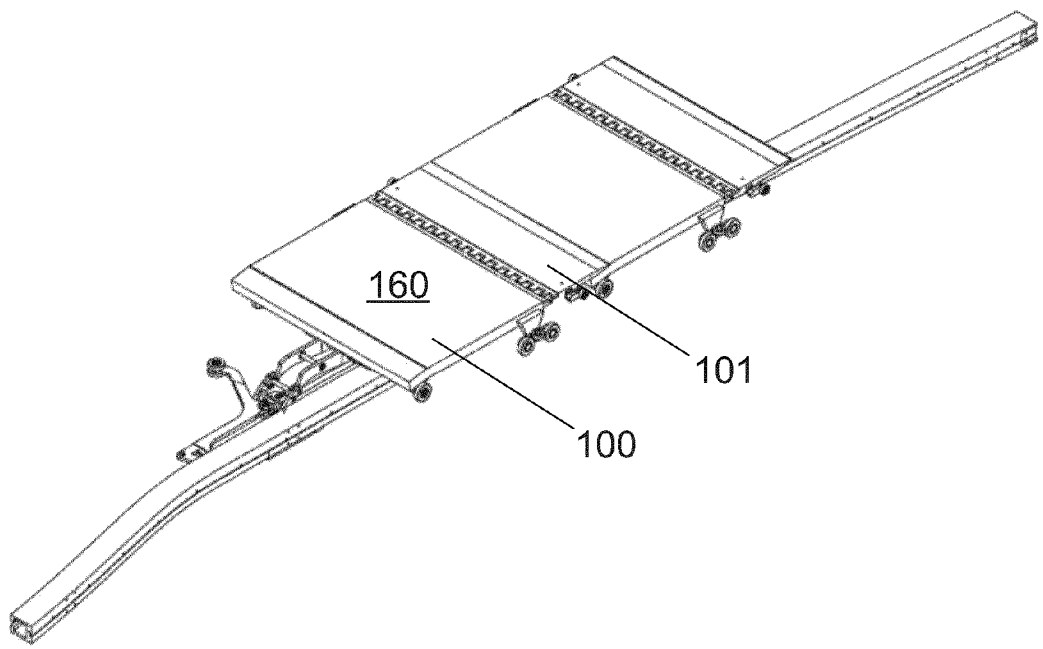
FIG. 1 shows a perspective view of one portion of the endless belt where several pallets assemblies are illustrated.

An embodiment of the invention relates to a conveyor system for the transportation of passengers/goods formed by a moving endless belt comprising a plurality of pallet assemblies or belts, wherein each assembly has, as shown in FIG. 1; a support surface (160) designed to support a passenger/good; and a pallet (101) driven by a drive pallet (100), both pallets (100, 101) being articulated to one another according to an axis perpendicular to the movement direction D of the belt.

The pallet assemblies are mounted in such a way that a relative distance between the pallet assemblies is variable.

Figure 2:
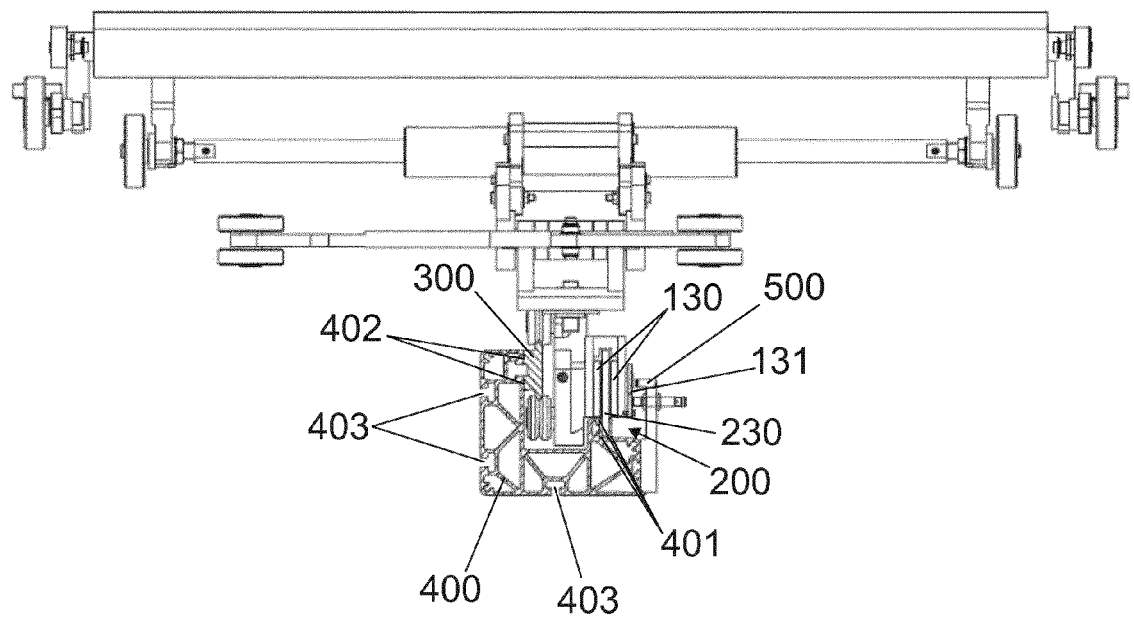
FIG. 2 shows an embodiment of the invention where several components of the system are illustrated.

The system comprises drive means (200), as shown in FIG. 2, designed to transmit a driving movement up to the pallet belt (100, 101) in a low speed section located in an embarking/disembarking area of the endless belt, in a high speed section located in a middle area of the endless belt, in a transitional speed section located between the embarking/disembarking area and the middle area of the endless belt.

The pallets (100, 101) of each assembly comprise a functional surface opposite to the support surface (160) and having first meshing means (130).

On the other hand, the drive means (200) comprise second meshing means (230), designed to interact with the first meshing means (130), so the drive pallets (100), are driven by the drive means (200) by means of a meshing between the first meshing means (130) and the second meshing means (230) and to drive said pallet belt (100, 101) in the movement direction D, and a linear motor aligned with the movement direction D.

The system also comprises guide means (300) aligned with the movement direction D, designed to ensure a meshing between the first meshing means (130) and the second meshing means (230) along the low speed section, the high speed section and the transitional speed section, as well as positioning means (400) designed to ensure a parallelism tolerance between the drive means (200) and the guide means (300) along the low speed section, the high speed section and the transitional speed section.

The positioning means (400) comprise a profile that comprises first connecting means (401), designed to be connected to the drive means (200), second connecting means (402), designed to be connected to the guide means (300) and, third connecting means (403) designed to be connected to the system location.

The linear motors of the drive means of each pallet belt or assembly are aligned with the movement direction D along the low speed section, the high speed section and the transitional speed section. The linear motors can be arranged one next to the other. They can be adjacent or separated. In the areas where a gap between the linear motors may exist, the distance between the linear motors can be different depending of the area where the linear motors are located.

These linear motors are powerful enough to drive pallet assemblies (100, 101) even in the event of an adjacent motor failure.

The system may comprise control means designed to control operating parameters of the system such as, the position of the pallet assemblies (100, 101), the speed of the pallet assemblies (100, 101) and speed patterns of the pallet assemblies (100, 101).

The control means comprise:
  a control mode of each controller depending on the progress of the first meshing means (130) over the linear motor; and
  a control selected between a position control and a force control.

The system of this embodiment, as shown in FIG. 2, comprises a plurality of sensors (500) designed for detecting an input of the first meshing means (130)—carriages comprising the magnets that define the magnetic flux—in the linear motors and for determining a position of the first meshing means (130) with regard to the linear motors at all times. The first meshing means (130) comprise a magnetic stripe (131) designed for indicating to the control system where each first meshing means (130) can be found.

The magnetic portion of the linear motor can be U-shaped (yoke) or have any other shape. It is also possible to use flat linear motors.

In a second preferred embodiment, the control system can be decentralized, where each linear motor is controlled by a controller.

In this second embodiment, the central processor (master) configures each controller so it executes in a decentralized manner a given movement profile. This specific movement profile for each controller is synchronized by means of a clock generated by the master, this way all the controllers execute simultaneously the orders of the movement profile. This movement profile provides over time, the position, as well as the sensor that should be used for the control, the control mode and force values. It further possesses a number of values large enough to ensure an efficient control. This movement profile covers one full movement cycle of the walkway (every time a pallet passes by), in such a way that when it ends it starts all over again, and it is cyclical.

In this way, the control mode of each controller is also defined, since depending on the progress of the carriage over the motor, the control mode shifts from position (master) to force (slave), which allows making smooth transitions between motors (there is a gap between them).

A further characteristic is that each controller must possess a high number (between 5 and 6) of inputs from position sensors, given that the distance between the sensors (fixedly placed) must be slightly shorter than the length of the stripe installed in the movement carriage, so it is possible to pass from one sensor to another with a reliable signal.

An alternative to this high number of inputs from the position sensors is the possibility of having a generator of a global position signal, which would be the sum of several sensors covering a full movement cycle. In that case, this global signal could be used as a single input to all the controllers, in such a way that with only two inputs the full movement cycle would be ensured at any position of the controller. This global position generator can be an external equipment or be integrated into the controller.

Figure 3C:
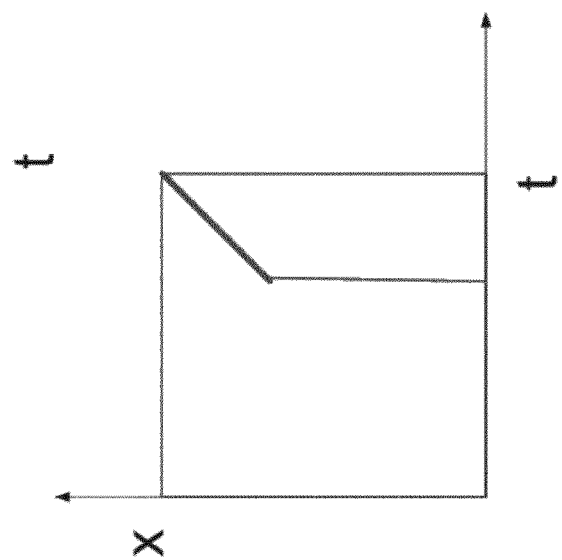
FIGS. 3A, 3B and 3C show the position of a pallet assembly controlled by means of different controllers.
Figure 3B:
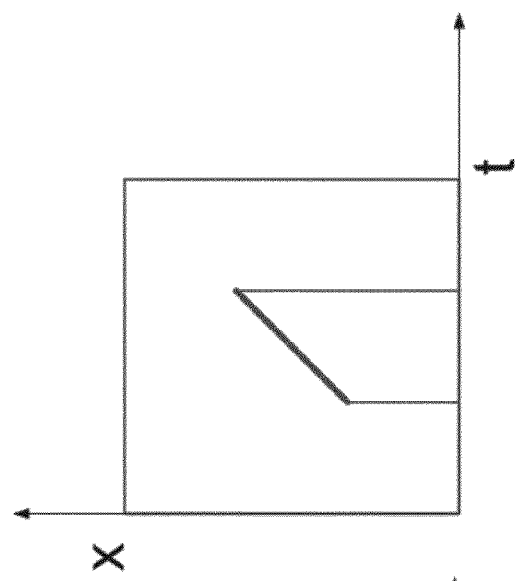
Figure 3A:
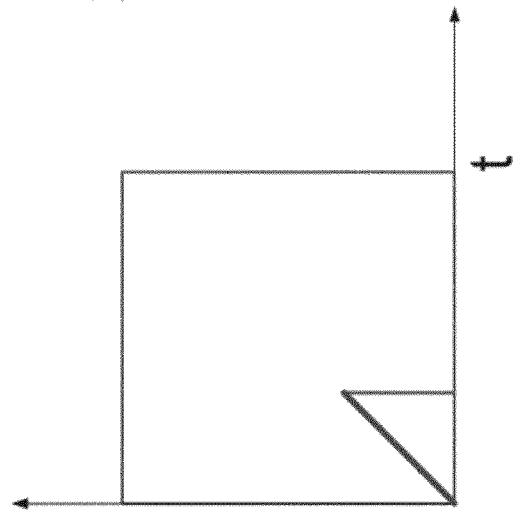

In the FIGS. 3A, 3B and 3C the area of the box indicates the time it takes to complete a full cycle (a pallet passage). Each controller, represented in each of the FIGS. 3A, 3B and 3C, executes a different profile depending on its location.

It is also possible to use one controller for several linear motors. This allows using in the central portion, at a constant speed, more powerful controllers and hence reducing the total number of controllers. Nevertheless, using one controller for each motor allows avoiding that a failure of one single controller leaves large areas without control.

Each controller manages one or more linear motors by means of some specific parameters, as an alternative to passing all the data through one single central processor that manages the motors altogether. This management is decentralized since given the great number of linear motors included in the conveyor system, envisaging the control by means of a centralized management would make the system ungovernable.

The invention claimed is:
1. A conveyor system for the transport of passengers/goods formed by a moving endless belt with an embarking/disembarking area comprising:
  a plurality of pallet assemblies wherein:
    each assembly has a support surface designed to support a passenger/good;
    each assembly comprises a driven pallet driven by a drive pallet, both pallets being articulated to one another according to an axis perpendicular to a movement direction D of the belt;
    the pallet assemblies are mounted at the conveyor system in such a way that a relative distance between the sets of pallets is variable;
  drive means designed to transmit a drive movement to a pallet belt in each of a low speed section, a high speed section and a transitional speed section, the drive means comprising:
    at least one linear motor in the low speed section located in the embarking/disembarking area of the endless belt, the embarking/disembarking area defining an area of which the passenger/goods are moved at a low speed;
    at least one linear motor in the high speed section located in a middle area of the endless belt, the high speed section defining an area of which the passenger/goods are moved at a high speed;
    at least one linear motor in the transitional speed section located between the embarking/disembarking area and the middle area of the endless belt;
  guide means aligned with the movement direction D, designed to ensure a meshing between the first meshing means and the second meshing means along the low speed section, the high speed section and the transitional speed section; and wherein the pallet assemblies comprise:

a functional surface opposite to the support surface and having first meshing means;

the drive means, comprise second meshing means designed to interact with a coupling means, so that the drive pallets, are driven by the drive means by means of a meshing between the first meshing means and the second meshing means and to drive said pallet belt in the movement direction D.

2. The system of any of claim 1 further comprising positioning means designed to ensure a parallelism tolerance between the drive means and the guide means along the low speed section, the high speed section and the transitional speed section.

3. The system of claim 2, wherein the positioning means comprise a profile comprising:

first connecting means designed for being connected to the drive means;

second connecting means designed for being connected to the guide means; and third connecting means designed for being connected to the system location.

4. The system of claim 1, wherein all of the at least one linear motors are powerful enough to drive the pallet assemblies even in the event of an adjacent motor failure.

5. The system of any of claim 1 further comprising control means designed to control operating parameters of the system, including:

positions of the pallet assemblies;
speeds of the pallet assemblies; and
speed patterns of the pallet assemblies.

6. The system of claim 4, further comprising a decentralized control system where each linear motor is controlled by a controller.

7. The system of claim 1 further comprising a plurality of sensors designed for detecting an input of the first meshing means in the linear motors and for determining a position of the first meshing means with regard to the linear motors at all times.

8. The system of claim 7 wherein a control mode for each controller depending on the progress of the first meshing means over the linear motor and a control selected between a position control and a force control.

9. The system of claim 1 wherein the first meshing means laterally bounds a first side of the second meshing means and laterally bounds a second side of the second meshing means.

10. The system of claim 9 wherein the second meshing means is positioned between the first meshing means.

* * * * *